US009456614B1

(12) United States Patent
Bell

(10) Patent No.: US 9,456,614 B1
(45) Date of Patent: Oct. 4, 2016

(54) CAKE DECORATING ASSEMBLY, KIT, AND METHOD OF USE

(71) Applicant: Maritza E. Bell, Springfield, MA (US)

(72) Inventor: Maritza E. Bell, Springfield, MA (US)

( * ) Notice: Subject to any disclaimer, the term of this patent is extended or adjusted under 35 U.S.C. 154(b) by 140 days.

(21) Appl. No.: 14/448,010

(22) Filed: Jul. 31, 2014

Related U.S. Application Data

(60) Provisional application No. 61/862,153, filed on Aug. 5, 2013.

(51) Int. Cl.
| | |
|---|---|
| *A23G 3/02* | (2006.01) |
| *A21C 15/00* | (2006.01) |
| *A21D 13/00* | (2006.01) |
| *A23G 3/28* | (2006.01) |
| *B26D 1/00* | (2006.01) |
| *A21C 15/04* | (2006.01) |
| *B26B 29/06* | (2006.01) |
| *B05C 11/04* | (2006.01) |

(52) U.S. Cl.
CPC ............. *A21C 15/002* (2013.01); *A21C 15/04* (2013.01); *A21D 13/0009* (2013.01); *A23G 3/02* (2013.01); *A23G 3/28* (2013.01); *B26B 29/063* (2013.01); *B26D 1/00* (2013.01); *B05C 11/04* (2013.01); *B05C 11/041* (2013.01); *B05C 11/044* (2013.01); *B05C 11/045* (2013.01)

(58) Field of Classification Search
CPC ....... A23G 3/02; A23G 3/28; A21D 13/0009
USPC ......................................... 118/13, 14, 15, 35
See application file for complete search history.

(56) References Cited

U.S. PATENT DOCUMENTS

| | | | |
|---|---|---|---|
| 173,777 | A | 2/1876 | Dugan et al. |
| 681,068 | A | 8/1901 | Noack |
| 716,788 | A | 12/1902 | Thomson |
| 922,039 | A | 5/1909 | Purcell |
| 935,425 | A | 9/1909 | Stewart |
| 1,472,022 | A | 10/1923 | Cockbill et al. |
| 1,753,549 | A | 4/1930 | Cates |
| 1,864,921 | A | 6/1932 | Mayer |
| 2,212,430 | A | 8/1940 | Zimmerman |
| 2,503,673 | A | 4/1950 | Lindquist |
| 2,569,886 | A | 10/1951 | Gapinski |

(Continued)

FOREIGN PATENT DOCUMENTS

| | | |
|---|---|---|
| GB | 23156 | 0/1912 |
| GB | 28421 | 0/1908 |

(Continued)

*Primary Examiner* — Laura Edwards
(74) *Attorney, Agent, or Firm* — Doherty Wallace Pillsbury & Murphy

(57) ABSTRACT

A cake decorating assembly, kit, and method of use comprising a mount which includes a longitudinally extending member. The assembly further comprises a top blade subassembly, a lateral blade subassembly, a gauge subassembly, and a cutting subassembly, all of which may be removably attached to the longitudinally extending member. All of the top blade subassembly, the lateral blade subassembly, the gauge subassembly, and the cutting subassembly may be vertically adjusted relative to the longitudinally extending member, while the gauge subassembly may also be horizontally adjusted relative to the longitudinally extending member. The cake decorating assembly provides for, e.g., the efficient decoration of a cake and further assists, e.g., in the even distribution of frosting on a cake.

16 Claims, 10 Drawing Sheets

(56) References Cited

U.S. PATENT DOCUMENTS

| | | |
|---|---|---|
| 2,779,099 A | 1/1957 | Barone |
| 2,863,479 A | 12/1958 | Macala |
| 3,138,186 A | 6/1964 | Laudien |
| 3,277,754 A | 10/1966 | Lopez |
| 3,420,210 A | 1/1969 | Lindquist |
| 3,912,249 A | 10/1975 | Vaca |
| 3,987,541 A | 10/1976 | Sieczkiewicz |
| 4,028,806 A | 6/1977 | Sheldon |
| 4,074,656 A | 2/1978 | Haapala |
| 4,213,241 A | 7/1980 | Haapala |
| 4,266,501 A | 5/1981 | Knupp et al. |
| 4,320,680 A | 3/1982 | de la Cruz et al. |
| 4,425,706 A | 1/1984 | Southworth et al. |
| 4,624,163 A | 11/1986 | Grace |
| 6,647,848 B1 | 11/2003 | Bruner |
| 7,000,564 B2 | 2/2006 | Franczyk |
| 7,824,123 B2 | 11/2010 | Liberatore |
| 7,975,643 B1 | 7/2011 | Johnson |
| 8,151,674 B2 | 4/2012 | Baeten et al. |
| 2006/0225646 A1 | 10/2006 | Phallen et al. |
| 2010/0293790 A1 | 11/2010 | Starr et al. |

FOREIGN PATENT DOCUMENTS

| | | | |
|---|---|---|---|
| GB | 2139078 | * | 11/1984 |
| JP | 2000262218 | | 9/2000 |

* cited by examiner

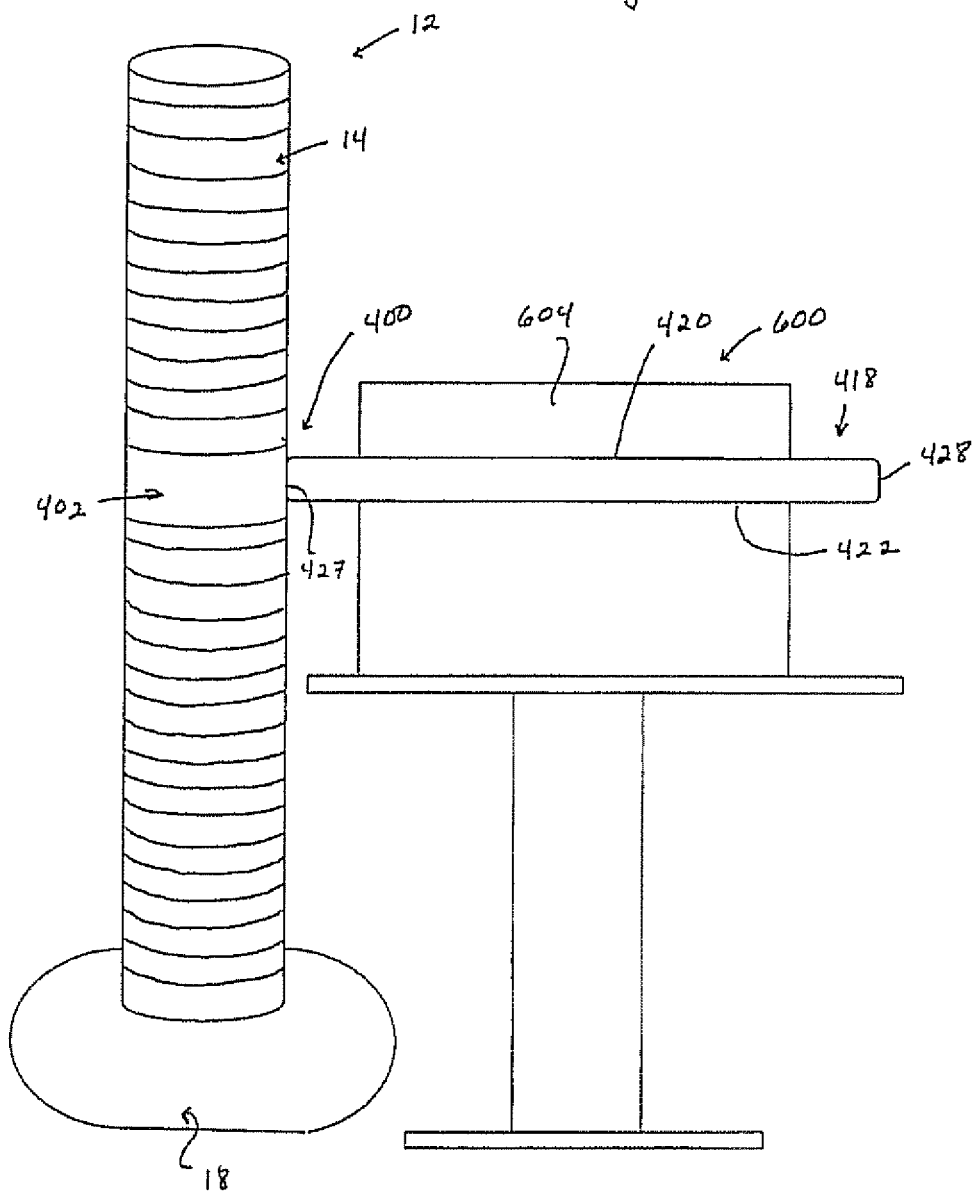

CAKE DECORATING ASSEMBLY, KIT, AND METHOD OF USE

BACKGROUND TO THE INVENTION

1. Field of the Invention

The present invention relates in general to a decorating assembly for food, and more particularly to an assembly for decorating a cake or similar baked goods.

2. Background of the Invention

In the field of cake decorating it is important to efficiently and evenly apply frosting to both the top and the sides of a variety of sized and geometrically configured cakes. Accordingly, it would be useful in the field of cake decorating to have an assembly capable of achieving an efficient way of applying frosting to a cake while evenly distributing the frosting on the cake. What is further needed is an assembly that will assist a decorator in applying a certain desired thickness of frosting to the cake, and to allow the cake to be frosted at various positions of the cake. The assembly should also be capable of quick assembly and disassembly, so that the individual components of the assembly may be cleaned separately from the other components and to facilitate repairs in the event that one of the components becomes damaged.

SUMMARY OF THE INVENTION

The disadvantages and short-comings of the prior art are eliminated or greatly reduced by a cake decorating assembly comprising a mount which includes a longitudinally extending member. The assembly further comprises a top blade subassembly, a lateral blade subassembly, a gauge subassembly, and a cutting subassembly, all of which may be removably attached to the longitudinally extending member. All of the top blade subassembly, the lateral blade subassembly, the gauge subassembly, and the cutting subassembly may be vertically adjusted relative to the longitudinally extending member, while the gauge subassembly may also be horizontally adjusted relative to the longitudinally extending member. The cake decorating assembly provides, e.g., a means to facilitate the efficient decoration of a cake and further assists, e.g., in the even distribution of frosting on a cake.

Further disclosed herein is a kit comprising a mount comprising a longitudinally extending member; a top blade subassembly comprising a blade and a collar, wherein the blade of the top blade subassembly extends from the collar of the top blade subassembly; a lateral blade subassembly comprising a blade and a collar, wherein the blade of the lateral blade subassembly extends from the collar of the lateral blade subassembly; a gauge subassembly comprising a frame, a proximal leg, and a distal leg, wherein the proximal leg and the distal leg extend from the frame, and further wherein a space separates the proximal leg from the distal leg; and a cutting subassembly comprising a knife and a collar, wherein the knife extends from the collar of the cutting blade subassembly. In an exemplary embodiment, the top blade subassembly, the lateral blade subassembly, the gauge subassembly, and the cutting subassembly are interchangeably positioned on the longitudinally extending member.

Further disclosed is a method for decorating a cake. In an exemplary embodiment, the method comprises providing a cake, wherein the cake comprises a top side and a lateral side, wherein the top side is raised and transversely positioned relative to the lateral side; providing a cake decorating assembly comprising a mount, a top blade subassembly, a lateral blade subassembly, a gauge subassembly, and a cutting subassembly. When attached to the mount, the top blade subassembly may be used to frost the top side of the cake, the lateral blade subassembly may be used to frost the lateral side of the cake, and the cutting subassembly may be used to cut the cake into cross-sectional layers.

When attached to the vertically extending member of the mount, the gauge subassembly may be used to assist a user in creating a desired thickness of frosting on the cake. In an exemplary embodiment, the gauge subassembly is positioned immediately adjacent to the lateral blade subassembly so as to allow a user to measure the thickness of the frosting applied by the blade of the lateral blade subassembly while the user is frosting the lateral side of the cake with the blade of the lateral blade subassembly. Additionally, the gauge subassembly may be moved in a direction transverse to the vertically extending member of the mount to allow a user to readily adjust the thickness of the frosting spread on the cake.

These, together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

For a better understanding of these and other objects of the present invention, reference will be made to the detailed description of the present invention which is to be read in association with the accompanying drawings, wherein:

FIG. 10 is a schematic depicting an exemplary arrangement between the mount depicted in FIG. 2, the cutting subassembly depicted in FIG. 9, and an exemplary cake.

DETAILED DESCRIPTION OF THE INVENTION

The cake decorating assembly of the present invention comprises a mount having a longitudinally extending member. The assembly further comprises a plurality of subassemblies which may be attached to the longitudinally extending member in a removable fashion wherein the subassemblies of the plurality assist in cake decorating process. In an exemplary embodiment, the plurality of subassemblies includes a top blade subassembly, a lateral blade subassembly, a gauge subassembly, and a cutting subassembly.

The top blade subassembly and the lateral blade subassembly are specially configured to assist in the even distribution of frosting over a respective top side and lateral side of a cake, the gauge subassembly is specially configured to assist in measuring the width of frosting applied on the cake, and the knife subassembly is specially configured to cut the cake into one or more layers.

In an exemplary embodiment, each of the top blade subassembly, the lateral blade subassembly, the gauge subassembly, and the cutting subassembly are capable of moving vertically along the longitudinally extending member, thereby allowing the subassemblies to accommodate a variety of sized cakes. Additionally, in an exemplary embodiment, the gauge subassembly is capable of moving horizontally relative to the longitudinally extending member. Further, in an exemplary embodiment, the gauge subassembly is disposed directly below the lateral blade subassembly such that the gauge subassembly can accurately measure the thickness of the frosting as the frosting is applied to the cake by the lateral blade subassembly.

An exemplary embodiment of the invention shall now be discussed with reference to the drawings, wherein it is to be understood that the invention is not limited by such disclosure and/or drawings, but shall include variations thereto as would occur to one of ordinary skill in the art upon reading the present disclosure.

Figure 2:
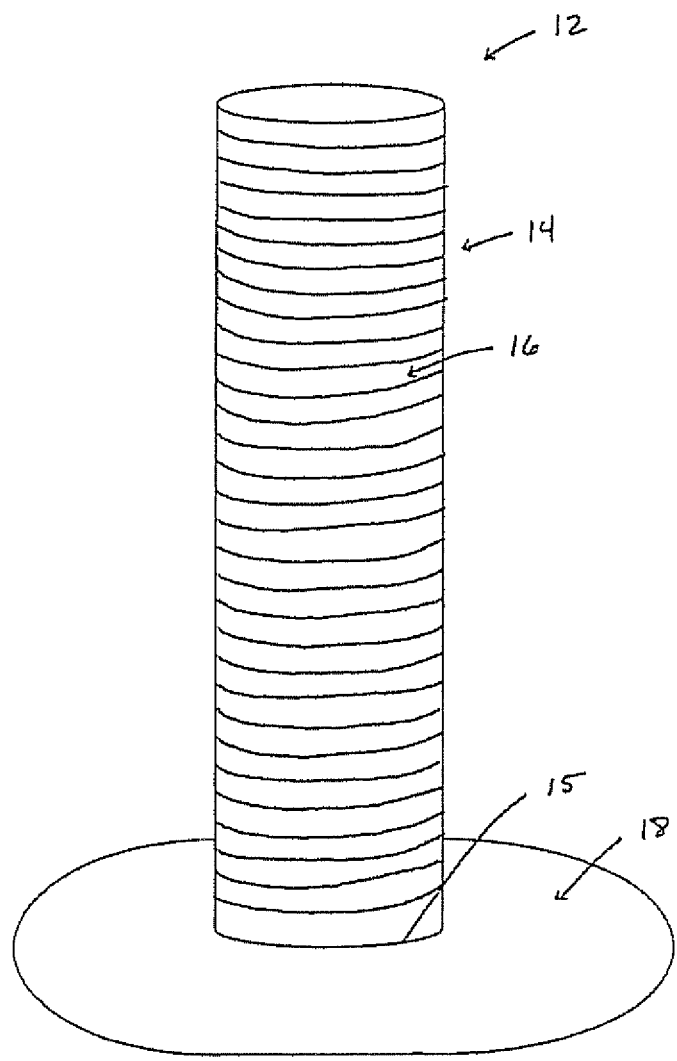
FIG. 2 is a schematic depicting an exemplary mount.

Referring to the drawings in detail wherein like elements are indicated by like numerals, there is shown an exemplary cake decorating assembly 10 comprising a mount 12, a top blade subassembly 100, a lateral blade subassembly 200, a gauge subassembly 300, and a cutting subassembly 400. Referring to FIG. 2, mount 12 comprises a vertically extending columnar member 14 having a threaded exterior wall 16. A bottom terminal end 15 of columnar member 14 is centrally disposed on a footing 18 of mount 12 such that columnar member 14 vertically extends from footing 18.

Figure 3:
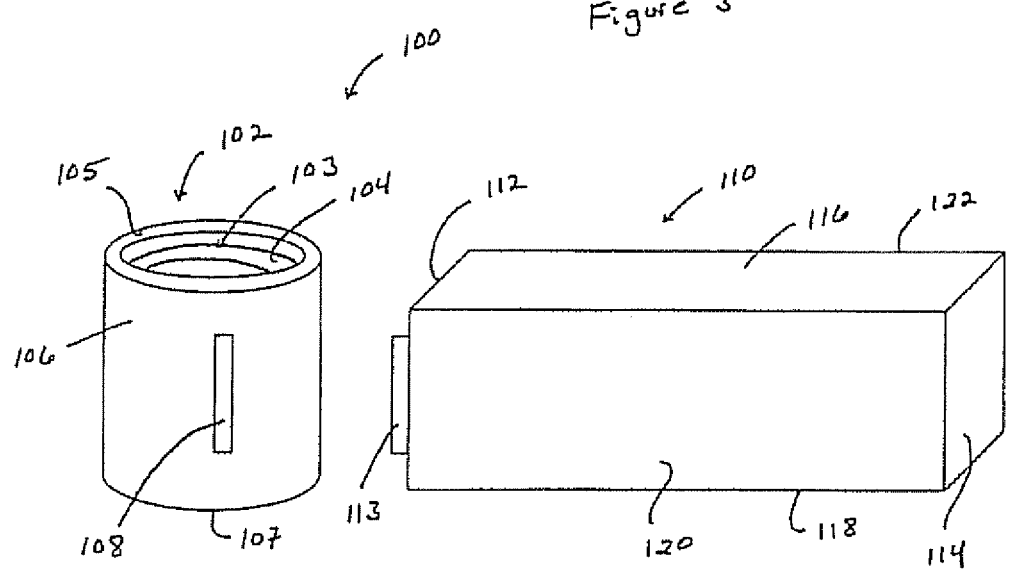
FIG. 3 is a schematic depicting an exemplary top blade subassembly.
Figure 4:
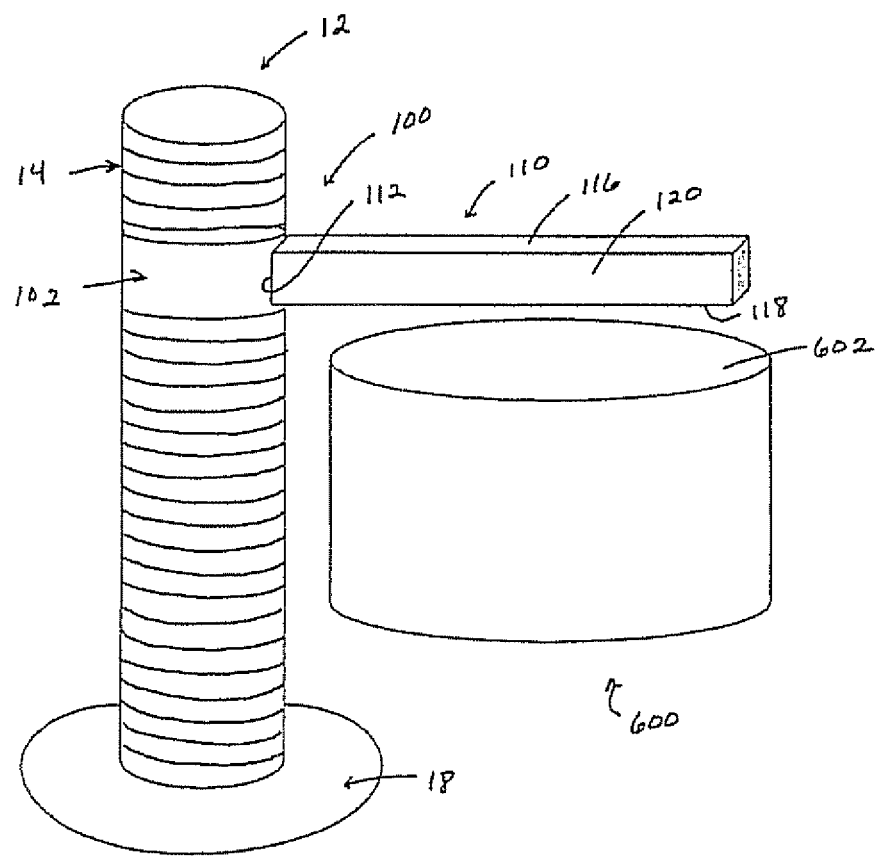
FIG. 4 is a schematic depicting an exemplary arrangement between the mount depicted in FIG. 2, the top blade subassembly depicted in FIG. 3 and an exemplary cake.

Referring to FIGS. 3 and 4, top blade subassembly 100 comprises a tubular-shaped collar 102 having an opening 103 formed through a top side 105 and a bottom side 107 thereof. Collar 102 further comprises a threaded interior wall 104 oppositely situated to an exterior wall 106 which extends from top side 105 to bottom side 107. Exterior wall 106 has a slot 108 formed therein. Subassembly 100 further comprises a blade 110 having a flange 113 disposed on a proximal lateral side 112 thereof, wherein flange 113 is received within slot 108 and is engaged therewith. Preferably blade 110 is removable from slot 108, but it is contemplated that it may be integrally formed therewith. Blade 110 further comprises a distal lateral side 114 oppositely situated from proximal lateral side 112, a top side 116 opposite to a bottom side 118, and a front side 120 opposite to a back side 122. When blade 110 is engaged with slot 108, front and back sides 120 and 122 are transversely positioned relative to top and bottom sides 105 and 107 of collar 102.

Figure 5:
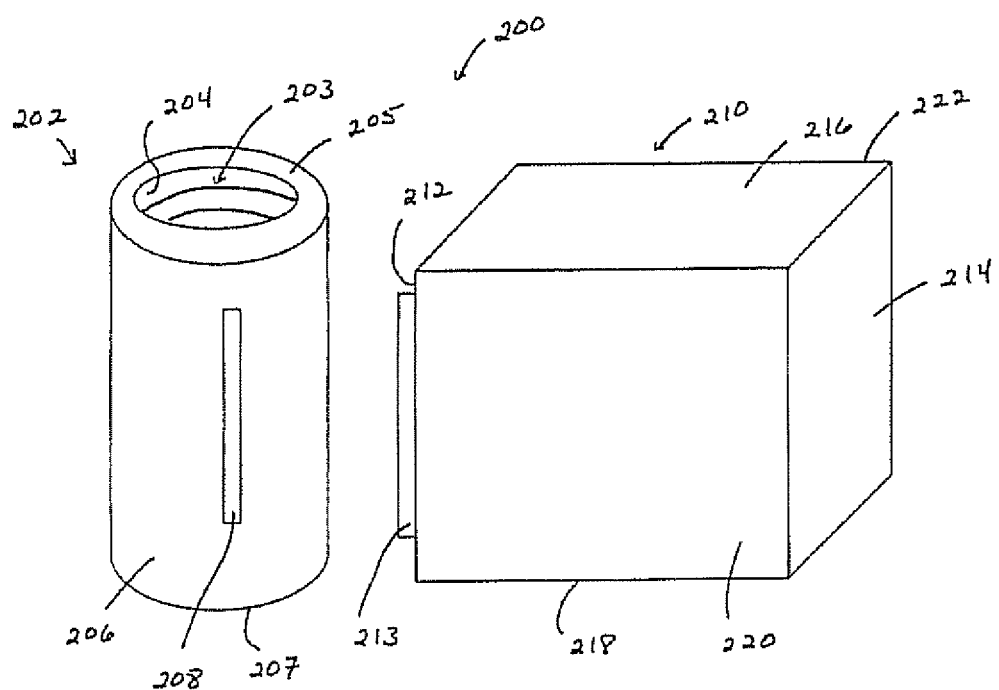
FIG. 5 is a schematic depicting an exemplary lateral blade subassembly.
Figure 6:
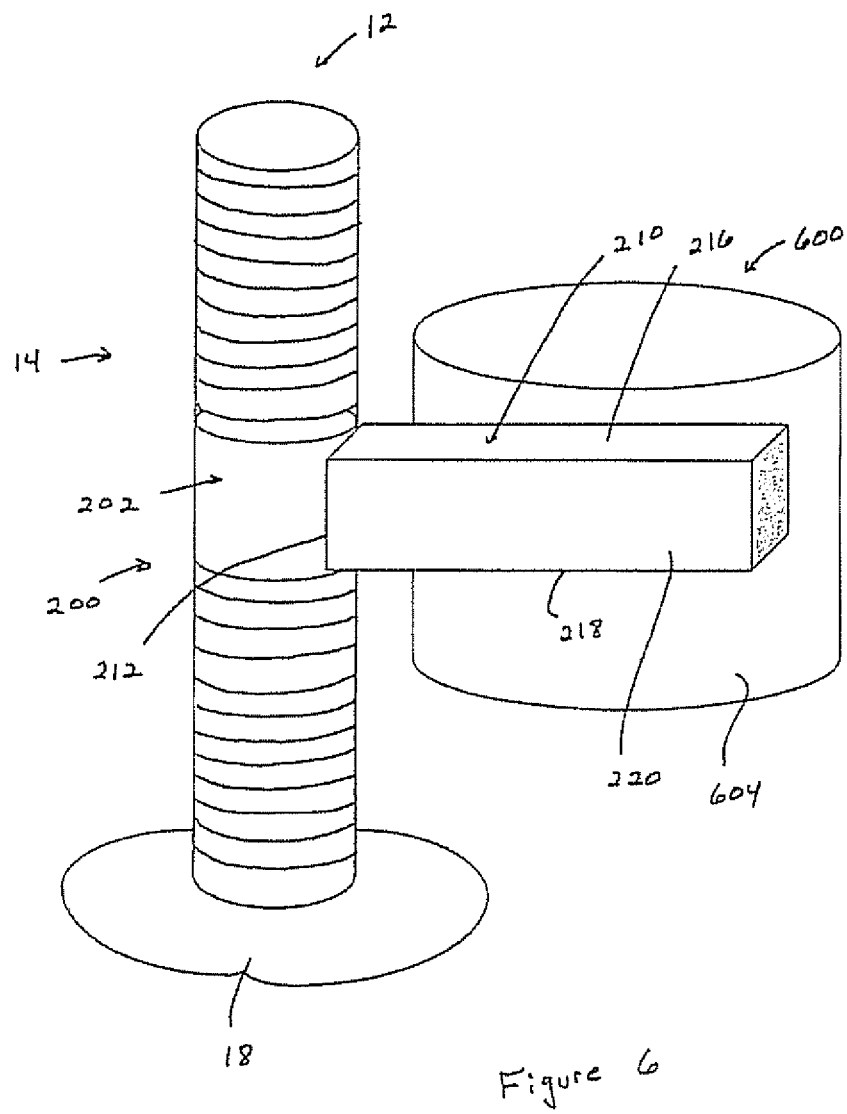
FIG. 6 is a schematic depicting an exemplary arrangement between the mount depicted in FIG. 2, the lateral blade subassembly depicted in FIG. 5, and an exemplary cake.

Referring to FIGS. 5 and 6, lateral blade subassembly 200 comprises a tubular-shaped collar 202 having an opening 203 formed through a top side 205 and a bottom side 207 thereof. Collar 202 further comprises a threaded interior wall 204 which is oppositely situated to an exterior wall 206 and which extends from top side 205 to bottom side 207. Exterior wall 206 has a slot 208 formed therein. Subassembly 200 further comprises a blade 210 having a flange 213 disposed on a proximal lateral side 212 thereof, wherein flange 213 is received within slot 208 and is engaged therewith. Preferably, blade 210 is removable from slot 208, but it is contemplated that it may be integrally formed therewith. Blade 210 further comprises a distal lateral side 214 oppositely situated from proximal lateral side 212, a top side 216 opposite to a bottom side 218, and a front side 220 opposite to a back side 222. When blade 210 is engaged with slot 208, front and back sides 220 and 222 are transversely positioned relative to top and bottom sides 205 and 207 of collar 202.

Figure 7:
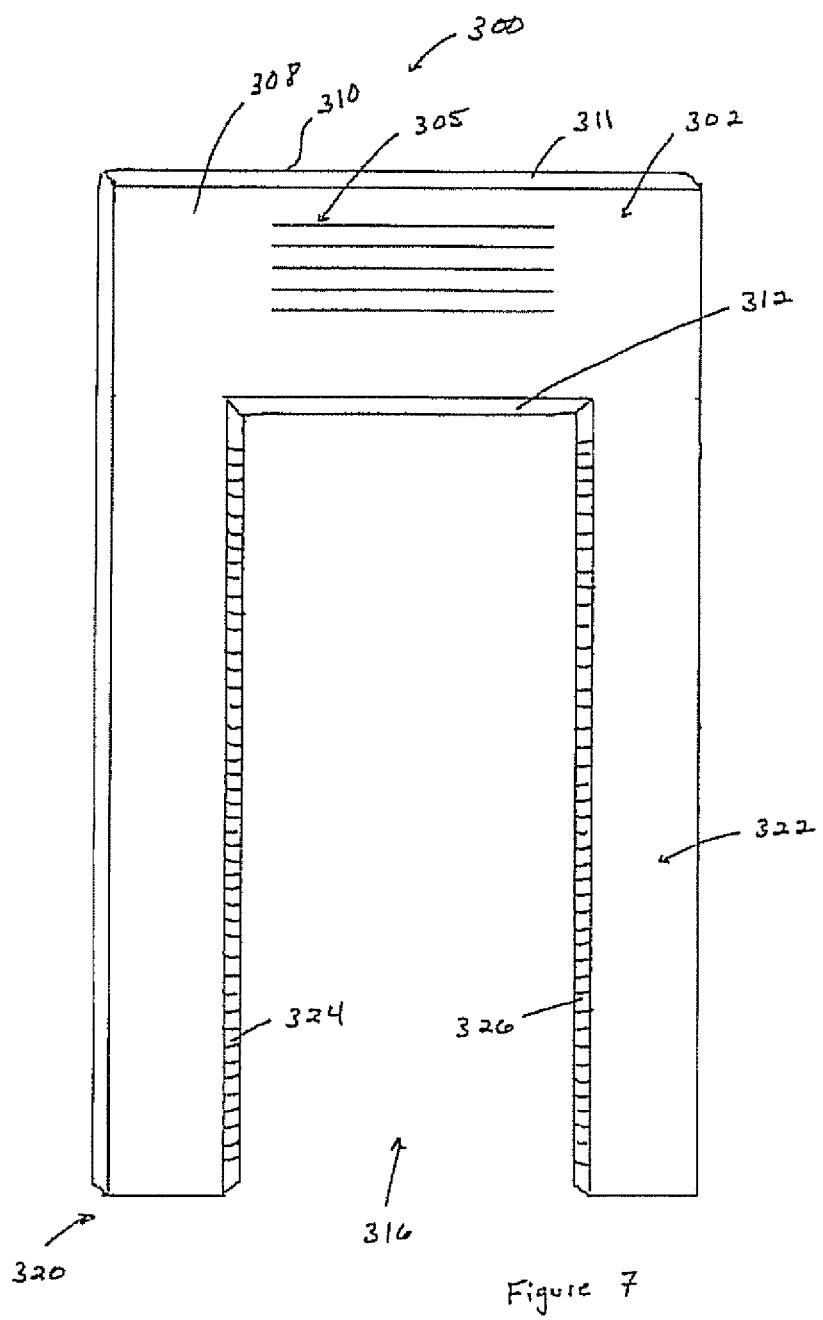
FIG. 7 is a schematic depicting an exemplary gauge subassembly.

Referring to FIG. 7, gauge subassembly 300 comprises a frame 302, a proximal leg 320, and a distal leg 322. Frame 302 has as its uppermost portion an anterior terminal wall 311, and has as its lowermost boundary an abutment wall 312. Frame 302 further comprises a top side 308 oppositely situated to a bottom side 310, wherein measuring indicia 305 are displayed on top side 308.

Each of proximal leg 320 and distal leg 322 longitudinally extend from frame 302 and are separated from one another via a space 316 such that gauge subassembly 300 has a substantially U-shaped configuration. Additionally, proximal leg 320 and distal leg 322 respectively comprise a threaded lateral side 324 and a threaded lateral side 326, wherein threaded lateral sides 324 and 326 are directed towards space 316.

Figure 9:
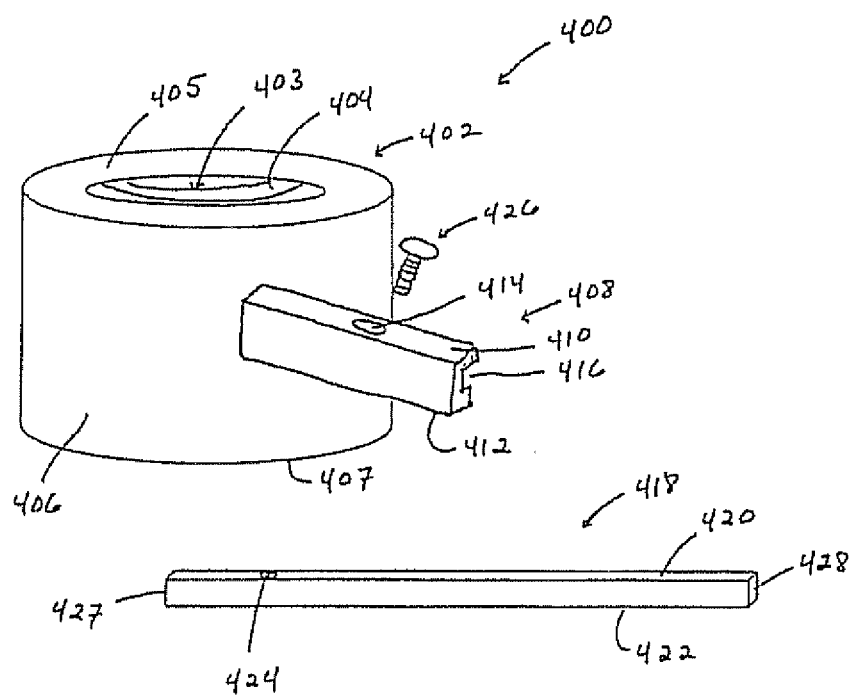
FIG. 9 is a schematic depicting an exemplary cutting subassembly.

Referring to FIGS. 9 and 10, cutting subassembly 400 comprises a tubular-shaped collar 402 having an opening 403 formed through a top side 405 and a bottom side 407 thereof. Collar 402 further comprises a threaded interior wall 404 oppositely situated to an exterior wall 406. Cutting subassembly 400 further comprises an attachment flange 408 which extends from exterior wall 406 and which has an upper plate 410 oppositely situated to a lower plate 412, wherein upper plate 410 is directed towards top side 405 of collar 402 and lower plate 412 is directed towards bottom side 407 of collar 402. Each of upper plate 410 and lower plate 412 has a hole 414 formed therethrough. An opening 416 separates upper plate 410 from lower plate 412.

Cutting subassembly 400 further comprises a knife 418 having a top side 420 oppositely situated to a bottom side 422, wherein a hole 424 is formed through top side 420 and bottom side 422. Knife 418 further comprises a proximal side 427 oppositely situated to a distal side 428, wherein distal side 428 is directed away from columnar member 14 when cutting subassembly 400 is attached to mount 12.

Figure 1:
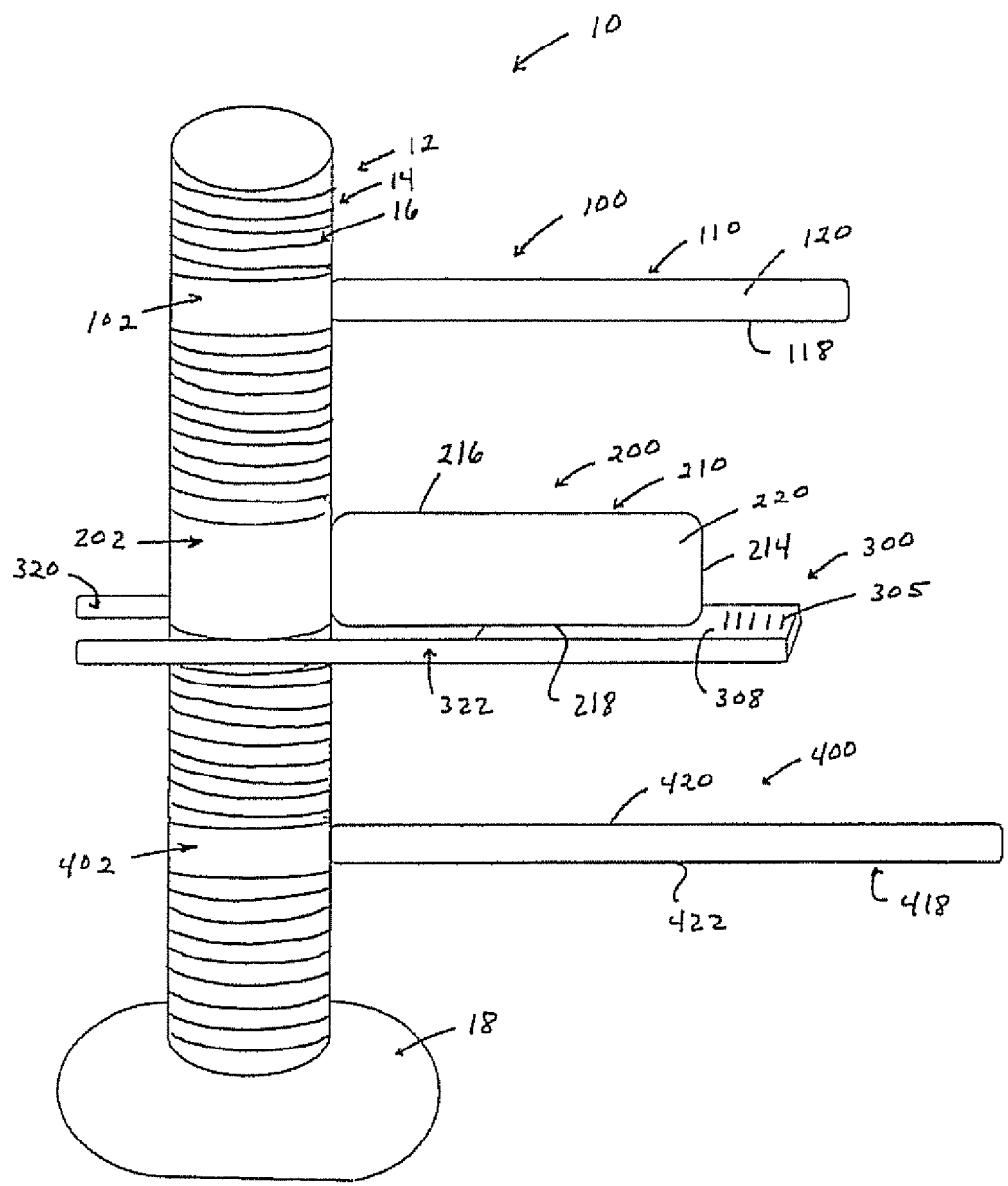
FIG. 1 is a schematic depicting an exemplary cake decorating assembly.

As shown in FIG. 1, each of top blade subassembly 100, lateral blade subassembly 200, and cutting subassembly 400 may be attached to mount 12 by respectively engaging threaded interior wall 104 of collar 102 of top blade subassembly 100, threaded interior wall 204 of collar 202 of lateral blade subassembly 200, and threaded interior wall 404 of collar 402 of cutting subassembly 400 with threaded exterior wall 16 of mount 12 such as by, e.g., rotating collars 102, 202, and 402 in a particular direction, e.g., in a clockwise direction. Similarly, each of subassemblies 100, 200, and 400 may be disengaged from mount 12, by, e.g., rotating respective collars 102, 202, and 402 in an opposite direction, e.g., in a counterclockwise direction. Blades 110 and 210 may be respectively attached to collars 102 and 202 by respectively engaging flanges 113 and 213 with slots 108 and 208. Knife 418 may be attached to collar 402 by positioning knife 418 within opening 416 of attachment flange 408, aligning holes 414 and 424, and positioning a securing member, such as, e.g., a screw 426, though holes 414 and 424 (see FIG. 9).

Figure 8:
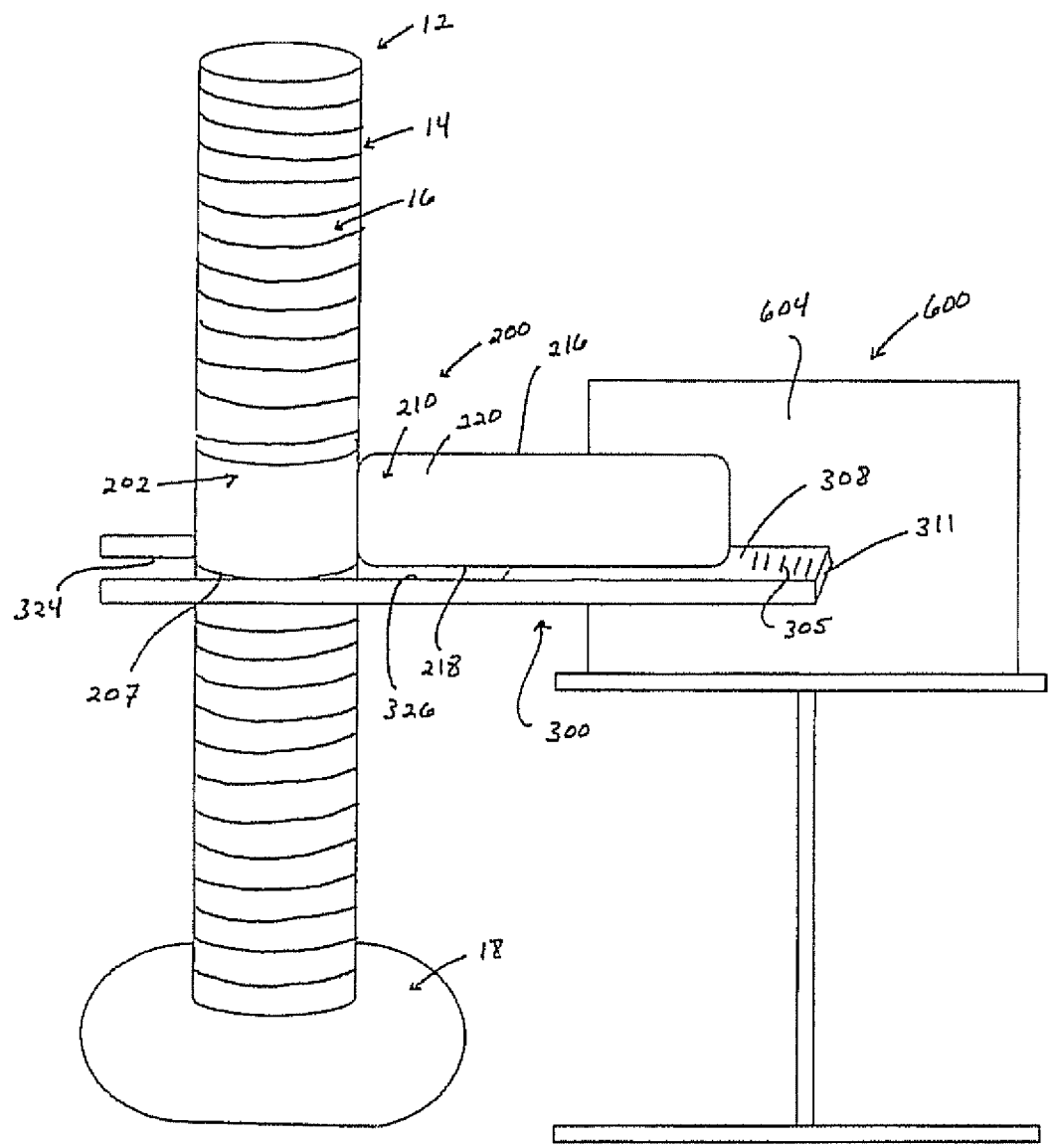
FIG. 8 is a schematic depicting an exemplary arrangement between the mount depicted in FIG. 2, the lateral blade subassembly depicted in FIG. 5, the gauge subassembly depicted in FIG. 7, and an exemplary cake.

As shown in FIGS. 1 and 8, gauge subassembly 300 may be attached to columnar member 14 of mount 12 by engaging threaded lateral sides 324 and 326 with threaded exterior wall 16 of columnar member 14. Threaded lateral sides 324 and 326 are formed to engage with threaded exterior wall 16 to allow movement of gauge subassembly 300 both longitudinally and transversely over columnar member 14, thereby allowing gauge subassembly 300 to be adjusted both vertically and horizontally relative to columnar member 14. The horizontal adjustment assists a user in obtaining a desired thickness of frosting on a cake.

In an exemplary embodiment, gauge subassembly 300 is disposed on columnar member 14 so that gauge subassembly 300 is immediately adjacent to lateral blade subassembly 200 and such that gauge subassembly 300 is sandwiched between lateral blade subassembly and footing 18. Additionally, preferably bottom side 218 of lateral blade subassembly 200 is directed towards top side 308 of frame 302 such measuring indicia 304 are visible to a user when the user is decorating a cake. In this position, gauge subassembly 300 may be best used to assist a user in distributing frosting of a particular thickness on the cake via blade 210 of lateral blade subassembly 200.

Cake decorating assembly 10 may be used to decorate an exemplary cake 600 as shown, e.g., in FIGS. 4, 6, 8, and 10. Although the Figures respectively depict subassembly 100, subassembly 200 and gauge subassembly 300, and subassembly 400 as separately attached to mount 12, any one or all of subassemblies 100, 200, and 400, and gauge subassembly 300 may be attached to mount 12 simultaneously when using any one of subassemblies 100, 200, and 400 and gauge subassembly 300 to ice cake 600.

Referring to FIG. 4, once top blade subassembly 100 has been positioned onto columnar member 14, e.g., once collar 102 has been rotated onto columnar member 14 until collar 102 is in a desired vertical position on, and is secured to, columnar member 14 and blade 110 has been secured to slot 108, bottom side 118 of blade 110 may be used to ice a top side 602 of cake 600.

Referring to FIG. 6, once lateral blade assembly 200 has been positioned onto columnar member 14, e.g., once collar 202 has been rotated onto mount 12 until collar 202 is in a desired vertical position on, and is secured to, columnar member 14 and blade 210 has been secured to slot 208, either of front side 220 and back side 222 of blade 210 may be used to frost a lateral side 604 of cake 600. FIG. 8 further depicts use of gauge subassembly 300 in combination with lateral blade assembly 200. Here, gauge subassembly may be used to measure a thickness of frosting applied to lateral side 604 of cake 600 while blade 210 distributes the frosting on lateral side 604.

Referring to FIG. 10, once knife subassembly 400 has been positioned onto columnar member 14, e.g., once collar 402 has been rotated onto columnar member 14 until collar 402 is in a desired vertical position on, and is secured to, columnar member 14, and knife 418 has been attached to collar 402, knife 418 may be used to transversely cut into cake 600, thereby, facilitating the cutting of cake 600 into one or more layers.

It is understood that the above-described embodiments are merely illustrative of the application. Other embodiments may be readily devised by those skilled in the art which will embody the principles of the invention and fall within the spirit and scope thereof.

As may be apparent from a reading of the above-provided disclosure, the cake decorating assembly of the present invention provides an effective and efficient means for decorating a cake. The top blade subassembly and the lateral blade subassembly allow for the even distribution of frosting on the cake, while the gauge subassembly ensures that a desired thickness of frosting has been distributed on the cake. The cutting subassembly allows the cake to be cut into one or more layers. By having all of the subassemblies located on a single mount, the assembly ensures that the cake decorator has all of his/her supplies at a single location. Additionally, because the vertical position of the subassemblies relative to the longitudinally extending member may be adjusted, the cake decorating assembly accommodates a variety of sized cakes. Furthermore, as the assemblies may be removed from the mount, the assembly provides an effective means for cleaning and/or replacing the subassemblies.

What is claimed is:

1. A cake decorating assembly comprising:
   a mount comprising a longitudinally extending member;
   a top blade subassembly comprising a blade and a collar, wherein the blade of the top blade subassembly extends from the collar of the top blade subassembly, and wherein, when the top blade subassembly is engaged with the mount, the collar of the top blade subassembly is disposed around the longitudinally extending member;
   a lateral blade subassembly comprising a blade and a collar, wherein the blade of the lateral blade subassembly extends from the collar of the lateral blade subassembly, and wherein, when the lateral blade subassembly is engaged with the mount, the collar of the lateral blade subassembly is disposed around the longitudinally extending member;
   a gauge subassembly comprising a frame, a proximal leg, and a distal leg, wherein the proximal leg and the distal leg extend from the frame, and further wherein a space separates the proximal leg from the distal leg, and wherein, when the gauge subassembly is engaged with the mount, the proximal leg and the distal leg are disposed on the longitudinally extending member; and
   a cutting subassembly comprising a knife and a collar, wherein the knife extends from the collar of the cutting subassembly, and wherein, when the cutting subassembly is engaged with the mount, the collar of the cutting subassembly is disposed around the longitudinally extending member.

2. The cake decorating assembly of claim 1, wherein a position of each of the top blade subassembly, the lateral blade subassembly, the gauge subassembly, and the cutting subassembly on the longitudinally extending member is adjustable along a vertical axis of the longitudinally extending member, and further wherein a position of the gauge subassembly is adjustable along a horizontal axis of the longitudinally extending member.

3. The cake decorating assembly of claim 1, wherein:
   the longitudinally extending member comprises a threaded exterior wall; and
   each of the collars of the top blade subassembly, the lateral blade subassembly, and the cutting subassembly comprises a threaded interior wall, wherein, when the top blade subassembly, the lateral blade subassembly, and the cutting subassembly are engaged with the mount, the respective threaded interior walls of the collars of the top blade subassembly, the lateral blade subassembly, and the cutting subassembly are engaged with the threaded exterior wall of the longitudinally extending member.

4. The cake decorating assembly of claim 3, wherein each of the proximal leg and the distal leg of the gauge subassembly comprises a threaded lateral side which is directed towards the space, and further wherein, when the gauge subassembly is engaged with the mount, the threaded lateral sides of the proximal leg and the distal leg are engaged with the threaded exterior wall of the longitudinally extending member.

5. The cake decorating assembly of claim 4, wherein each of the collars of the top blade subassembly and the lateral blade subassembly has a slot formed therethrough, and further wherein each of the blades of the top blade subassembly and the lateral blade subassembly has a flange disposed on a lateral side of the respective top blade subassembly and the lateral blade subassembly, and further wherein the flange of the top blade subassembly is disposed within the slot of the top blade subassembly, and the flange of the lateral blade subassembly is disposed within the slot of the lateral blade subassembly to thereby secure the blades to the respective collars.

6. The cake decorating assembly of claim 5, wherein the cutting subassembly further comprises an attachment flange which extends from the collar of the cutting subassembly, wherein the attachment flange receives and holds the knife.

7. The cake decorating assembly of claim 6, wherein the attachment flange comprises an upper plate oppositely situated to a lower plate, and further wherein a portion of the knife is positioned between the upper plate and the lower plate.

8. The cake decorating assembly of claim 7, further comprising a securing member, and further wherein:
each of the upper plate and the lower plate of the attachment flange has a hole formed therethrough; and
the knife comprise a top side oppositely situated to a bottom side, wherein each of the top side of the knife and the bottom side of the knife has a hole formed therethrough;
wherein the knife is disposed between the upper plate and the lower plate of the attachment flange, and further wherein the securing member is disposed through the holes of the upper plate, the lower plate, the top side of the knife, and the bottom side of the knife.

9. The cake decorating assembly of claim 5, wherein the frame of the gauge subassembly comprises a top side having measuring indicia displayed thereon.

10. The cake decorating assembly of claim 9, wherein the blade of the lateral blade subassembly comprises a bottom side transverse to the lateral side of the blade of the lateral blade subassembly, and further wherein, when the lateral blade subassembly and the gauge subassembly are engaged with the longitudinally extending member of the mount, the top side of the gauge subassembly is directed towards the bottom side of the blade of the lateral blade subassembly and is positioned immediately adjacent thereto.

11. A cake decorating kit, comprising:
a mount comprising a longitudinally extending member;
a top blade subassembly comprising a blade and a collar, wherein the blade of the top blade subassembly extends from the collar of the top blade subassembly;
a lateral blade subassembly comprising a blade and a collar, wherein the blade of the lateral blade subassembly extends from the collar of the lateral blade subassembly;
a gauge subassembly comprising a frame, a proximal leg, and a distal leg, wherein the proximal leg and the distal leg extend from the frame, and further wherein a space separates the proximal leg from the distal leg; and
a cutting subassembly comprising a knife and a collar, wherein the knife extends from the collar of the cutting blade subassembly;
wherein the collars of the top blade subassembly, the lateral blade subassembly, and the cutting subassembly, and the frame of the gauge subassembly are engaged with the longitudinally extending member of the mount.

12. The cake decorating kit of claim 11, wherein the top blade subassembly, the lateral blade subassembly, the gauge subassembly, and the cutting subassembly are interchangeably positioned on the longitudinally extending member.

13. The cake decorating kit of claim 12, wherein each of the collars of the top blade subassembly and the lateral blade subassembly has a slot formed therethrough, and further wherein each of the blades of the top blade subassembly and the lateral blade subassembly has a flange disposed on a lateral side of the respective top blade subassembly and the lateral blade subassembly, and further wherein the flange of the top blade subassembly is disposed within the slot of the top blade subassembly, and the flange of the lateral blade subassembly is disposed within the slot of the lateral blade subassembly, to thereby secure the blades to the respective collars.

14. The cake decorating kit of claim 13, wherein:
the longitudinally extending member comprises a threaded exterior wall; and
each of the collars of the top blade subassembly, the lateral blade subassembly, and the cutting subassembly comprises a threaded interior wall, wherein, the threaded interior walls of the collars of the top blade subassembly, the lateral blade subassembly, and the cutting subassembly are engaged with the threaded exterior wall of the longitudinally extending member to thereby respectively secure the top blade subassembly, the lateral blade subassembly, and the cutting subassembly to the mount.

15. The cake decorating kit of claim 14, wherein each of the proximal leg and the distal leg of the gauge subassembly comprises a threaded lateral side which is directed towards the space, wherein, the threaded lateral sides of the proximal leg and the distal leg are engaged with the threaded exterior wall of the longitudinally extending member when the gauge subassembly is fixed to the mount.

16. The cake decorating kit of claim 15, wherein the cutting subassembly further comprises an attachment flange which extends from the collar of the cutting subassembly, wherein the attachment flange comprises an upper plate oppositely situated to a lower plate, and further wherein a portion of the knife is positioned between the upper plate and the lower plate.

* * * * *